United States Patent [19]

Karl

[11] Patent Number: 5,292,708
[45] Date of Patent: Mar. 8, 1994

[54] METHOD OF PRODUCING ACTIVATED CARBON FROM PIT-WET LIGNITE

[75] Inventor: Alfons Karl, Gruendau, Fed. Rep. of Germany

[73] Assignee: Degussa Aktiengesellschaft, Frankfurt, Fed. Rep. of Germany

[21] Appl. No.: 864,140

[22] Filed: Apr. 6, 1992

Related U.S. Application Data

[63] Continuation of Ser. No. 742,516, Aug. 6, 1991, abandoned, which is a continuation of Ser. No. 544,459, Jul. 19, 1990, abandoned, which is a continuation of Ser. No. 415,979, Oct. 3, 1989, abandoned.

[30] Foreign Application Priority Data

Oct. 12, 1988 [DE] Fed. Rep. of Germany ....... 3834745

[51] Int. Cl.$^5$ .............. C01B 31/12; C01B 31/08; B01J 20/20
[52] U.S. Cl. .................. 502/427; 502/417; 502/418; 502/437
[58] Field of Search ............. 502/427, 417, 418, 419, 502/437

[56] References Cited

U.S. PATENT DOCUMENTS 4,039,473  8/1977  Shafer ................. 502/427
4,603,119  7/1986  Karl et al. ............ 502/427

OTHER PUBLICATIONS

*Production And Briquetting Of Carbonized Lignite*—Bulletin 221 by E. J. Babcock and W. W. Odell—pp. 34–43 Bubl.—Dept. Of Interior—Bureau Of Mines—Wash. D.C. (1923).

Primary Examiner—Paul E. Konopka
Attorney, Agent, or Firm—Beveridge, Degrandi, Weilacher & Young

[57] ABSTRACT

A method of producing activated carbon from lignite, in which pit-wet lignite is heated to high temperatures. The invention further describes the heating of the lignite in the presence of additional water vapor. The invention also contemplates the addition of potassium ions to the lignite, in the form of potassium hydroxide.

7 Claims, 1 Drawing Sheet

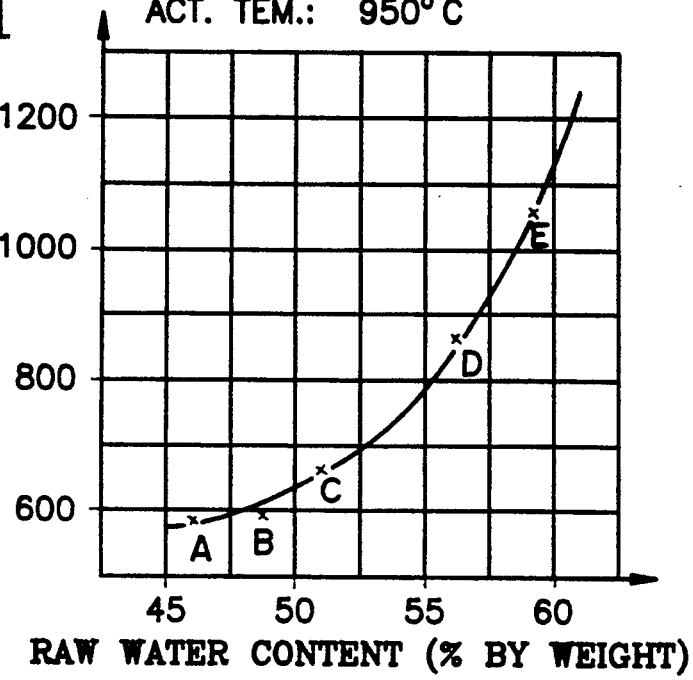
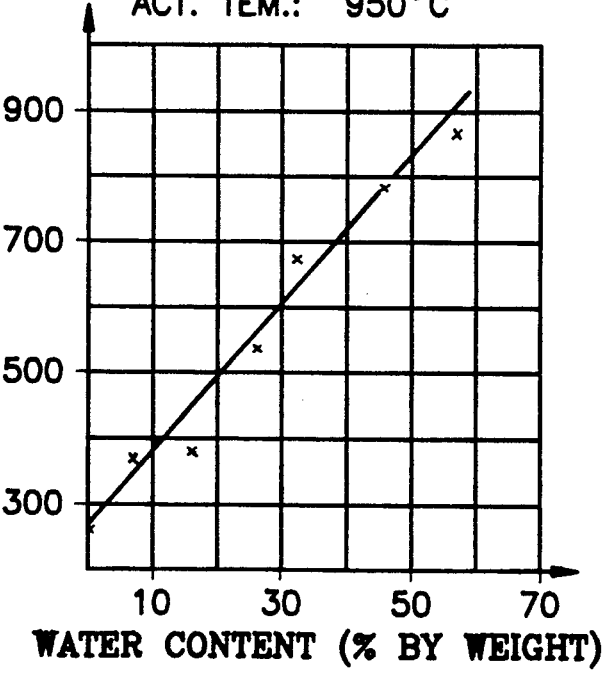

METHOD OF PRODUCING ACTIVATED CARBON FROM PIT-WET LIGNITE

This specification is a continuation of Ser. No. 07/742,516 filed Aug. 6, 1991, which is a continuation of Ser. No. 07/544,459 filed Jul. 19, 1990, which is a continuation of Ser. No. 07/415,979 filed Oct. 3, 1989, all now abandoned.

BACKGROUND OF THE INVENTION

The invention relates to a method of producing activated carbon based on lignite [brown coal].

The production of activated carbon from lignite is known. Such known methods are described in the following documents:

D. J. McCarthy, Carbon 15 (1977), pp. 95–101.

Lignite is dried and briquetted. The lignite briquettes are comminuted again and activated with water vapor in a countercurrent.

R. A. Durie et al, Fuel 58 (1979), pp. 472–476.

The lignite is subjected to an acid washing and an ion exchange, dried in air, optionally granulated, carbonized and activated with water vapor.

L. J. Harner et al., Proc.-Int. Conf. Coal Res. 5th, 1980, 805-19/CA 90: 74826Y.

The lignite is predried to a moisture content of approximately 16% by weight and briquetted. The briquettes are comminuted again, carbonized and activated with water vapor.

A. Albiniak et al., Pr. Nauk. Inst. Chem. Technol. Nafty Wegla Politech. Wroclaw 41 (1985) 213-8 / CA 104: 209 764 n.

The lignite is dried, coked and subsequently activated with water vapor, carbon dioxide and oxygen.

DE-OS 36 03 003.

The lignite is dried, pyrolized at 350°–500° C. and activated with water vapor at 700°–800° C.

DDR-PS 207 183.

The lignite is dried to a moisture content of 20%, extracted with organic solvents, dried in air, subsequently mixed with sawdust and zinc chloride solution, granulated and heated to 600°–750° C.

DDR-PS 211 331.

The lignite is predried, mixed with sawdust and/or peat as well as hydrochloric zinc chloride solution, granulated and heated to 650°–750° C.

DDR-PS 227 946.

The lignite is dried and pressed to blanks, the blanks are comminuted, the comminuted blanks are finally pressed to blanks again, the finally-pressed blanks are degassed, comminuted and activated in known activating reactors.

EP-PS 2275 and EP-PS 2674.

The lignite is subjected to an acid and water washing, dried, ground and briquetted. The briquettes are comminuted, carbonized (at a low temperature) and activated.

Kirk-Othmer, *Encyclopedia of Chemical Terminology*, 3rd Edition, Vol. 4, pp. 561–569, "Activated Carbon" also describes some prior art methods of processing lignite into activated carbon.

These prior art references show the background methods and are herein incorporated in their entirety.

The known methods have the disadvantage that numerous method steps are required, for example, water and acid washing, drying, grinding, briquetting and coking of the lignite are necessary as a pretreatment of the lignite.

BRIEF SUMMARY OF THE INVENTION

An object of the invention is to provide a method of producing activated carbon from lignite. The method is featured by heating pit-wet lignite to rather high temperatures, optionally, with the addition of potassium ions.

The term "pit-wet lignite", as used in this specification, means a lignite which is processed immediately after its removal from the mine, without altering its natural water content, in accordance with the method of the invention.

In individual instances the water content of the pit-wet lignite may be lowered by drying to an amount of 30% by weight. This drying can be accomplished with driers that are known in the art.

However, drying adversely affects the adsorption capacity of the final product produced from a partially predried lignite.

The temperature to which the pit-wet lignite is heated can be greater than 600° C., and preferably greater than 800° C. It is advantageous to add additional water vapor during the heating of the pit-wet lignite. It is also advantageous to add additional potassium ions in aqueous solution during the heating of the pit-wet lignite.

The method of the invention has the advantage that activated carbon can be produced from pit-wet lignite in a single method step.

The method of the invention can be carried out in known activating devices.

BRIEF DESCRIPTION OF THE DRAWINGS

These and other advantageous features of the invention will be more fully appreciated when viewed with the accompanying drawings wherein:

FIG. 1 is a plot showing the relationship between the iodine value and the water content of the pit-lignite; and FIG. 2 is a plot of the iodine value vs. the water content of a stepwise dried lignite.

DETAILED DESCRIPTION OF THE INVENTION

Examples

Five different lignites A, B, C, D and E whose properties are listed in table 1 were used for the tests.

The lignites, supplied in a pit-wet and coarse state, were broken in a jaw crusher and sieved to a fraction of 1–4 mm, depending upon the rotating cylinder kiln used. The heating of the lignites took place in the indirectly heated rotating cylinder kiln under variation of the temperature, variation of the water content, variation of the gaseous atmosphere and variation of the potassium content.

Conditions rotating cylinder kiln: indirectly heated
activating temperature: 600°–1000° C.
amount of water vapor: without water vapor, or 1000 g/h in reference tests
rpms: 7.5 rpms
retarding dam height: without retarding disk
dwell time: approximately 15 min.
cylinder inclination: approximately 1%.

The products were thoroughly washed with water and tested according to methods known in the art.

Raw material influences

The obtained adsorption capacity (iodine number) is a function of the original water content of the lignite. The adsorption capacity is improved as the water content of the pit-wet lignite increases (cf. FIG. 1 and Table 2).

Influence of the activating temperature

The influence of the temperature was tested in a range of 600°–1000° C. (cf. Table 3). Again, adsorption capacity improves with the increase in activation temperature, as evidenced by the increase in iodine number.

Influence of the drying

In order to test the influence of drying on the adsorption capacity, lignite D was dried in stages. The inverse method of first completely drying the lignite and adjusting the water content by means of the addition of water is not possible. When the water content of lignite is reduced, the adsorption capacity is impaired (FIG. 2 and Table 4).

Addition of vapor

In the comparison of pit-wet lignite without the addition of water vapor to dried lignite with the addition of water vapor, the dried lignite yields activated carbons with considerably worse adsorption properties at approximately the same yield. If pit-wet lignite is used, the adsorption capacity can be positively influenced by an additional supplying of water vapor (Table 5).

Tests under potassium catalysis

The pit-wet lignites were sprayed with potash lye, which slightly raised the water content of the lignites. The addition of potassium (1.0% by weight KOH and onto dry carbon) resulted in a distinct increase of the number of fine pores in the products (cf. Table 6).

The influence of the potassium concentration in a range of 0 to 2.0% by weight KOH (and onto dry carbon) was tested using lignite C. It can be shown using the benzene isotherm that as the potassium content increases, the number of mesopores decreases and the number of micropores increases (cf. Table 7).

While the invention has been described with particular examples and embodiments, various modifications may be made without departing from the spirit and scope of the claims.

TABLE 1

Properties of lignite

| Lignite | Water content wt. % | Ash content % (wf) | Volatile content % (wf) | C-fixed % (wf) | C % (waf) | H % (waf) | N % (waf) | O % (waf) | S % (waf) | Atomic proportions H/C | Atomic proportions O/C | Maceral group analysis huminite % | liptinite % | inertinite % | Pore volume ml/g | True density g/ml | Porosity Vol. % |
|---|---|---|---|---|---|---|---|---|---|---|---|---|---|---|---|---|---|
| A | 46 | 10.2 | 67.4 | 22.4 | 71.1 | 6.5 | 1.1 | 20.6 | 0.56 | 1.09 | 0.22 | 95 | 4 | 1 | 0.238 | 1.634 | 28.0 |
| B | 49 | 7.1 | 77.8 | 15.1 | 71.1 | 7.2 | 1.2 | 20.2 | 0.25 | 1.21 | 0.21 | 82 | 11 | 7 | 0.277 | 1.535 | 29.8 |
| C | 51 | 5.3 | 56.1 | 38.6 | 73.5 | 7.8 | 1.2 | 16.8 | 0.48 | 1.26 | 0.17 | 92 | 5 | 3 | 0.390 | 1.594 | 38.3 |
| D | 56 | 2.0 | 61.4 | 36.6 | 72.7 | 6.6 | 1.1 | 19.0 | 0.40 | 1.09 | 0.20 | 92 | 5 | 3 | 0.262 | 1.506 | 29.1 |
| E | 59 | 0.9 | 58.3 | 40.8 | 65.3 | 6.6 | 1.2 | 26.4 | 0.45 | 1.21 | 0.30 | 85 | 10 | 5 | 0.714 | 1.520 | 52.0 |

TABLE 2

Variation of the raw material

Activating temperature: 950° C.
carbon storage: 300 g/h and onto dry carbon

| Lignite | Water content % weight | Furnace yield % by weight | Benzene isotherm AS (% by weight) 9/10 | 1/10 | 1/100 | 1/1000 | Iodine value mg/g | Methylene blue titer ml/0.1 g | Molasses mg value |
|---|---|---|---|---|---|---|---|---|---|
| A | 46 | 9.1 | 56.6 | 18.4 | 11.4 | 5.9 | 585 | 11.0 | 195 |
| B | 49 | 17.4 | 49.0 | 17.8 | 11.9 | 7.4 | 595 | 11.0 | 215 |
| C | 51 | 9.2 | 45.3 | 18.3 | 12.0 | 7.4 | 660 | 11.5 | 200 |
| D | 56 | 9.4 | 52.1 | 22.8 | 16.0 | 9.4 | 865 | 13.5 | 180 |
| E | 59 | 13.9 | 55.7 | 29.9 | 23.0 | 14.1 | 1050 | 15.5 | 190 |

TABLE 3

Variation of the activating temperature

Lignite D
Water content: 56% by weight
Carbon charge: 375 g/h and onto dry carbon

| Activating temperature °C. | Furnace yield % by weight | Benzene isotherm AS (% by weight) 9/10 | 1/10 | 1/100 | 1/1000 | Iodine value mg/g | Methylene blue titer ml/0.1 g | Molasses mg value mg |
|---|---|---|---|---|---|---|---|---|
| 600 | 42.1 | 0.9 | 0.3 | 0.2 | — | 55 | 0.5 | >3000 |
| 700 | 27.2 | 14.3 | 11.0 | 8.8 | 6.8 | 295 | 0.5 | >3000 |
| 800 | 27.4 | 39.4 | 17.3 | 12.2 | 8.0 | 590 | 6.0 | 360 |
| 850 | 24.5 | 39.7 | 20.0 | 14.7 | 9.9 | 670 | 6.0 | 370 |
| 900 | 21.2 | 43.3 | 20.8 | 15.3 | 10.1 | 725 | 6.0 | 295 |

TABLE 3-continued

Variation of the activating temperature

Lignite D
Water content: 56% by weight
Carbon charge: 375 g/h and onto dry carbon

| Activating temperature °C. | Furnace yield % by weight | Benzene isotherm AS (% by weight) | | | | Iodine value mg/g | Methylene blue titer ml/0.1 g | Molasses mg value mg |
|---|---|---|---|---|---|---|---|---|
| | | 9/10 | 1/10 | 1/100 | 1/1000 | | | |
| 950 | 12.1 | 52.9 | 23.7 | 17.1 | 10.9 | 835 | 9.0 | 215 |
| 1000 | 6.0 | 58.8 | 24.3 | 17.3 | 10.8 | 790 | 10.5 | 170 |

TABLE 4

Variation of the water content

Lignite D
Activating temperature: 950° C.
Carbon charge: 300 g/h and onto dry carbon

| Water Content % by weight | Furnace yield % by weight | Benzene Isotherm AS (% by weight) | | | | Iodine value mg/g | Methylene blue titer ml/0.1 g | Molasses value mg |
|---|---|---|---|---|---|---|---|---|
| | | 9/10 | 1/10 | 1/100 | 1/1000 | | | |
| <1 | 38.3 | 14.2 | 6.8 | 5.5 | 4.1 | 275 | 2.0 | 2800 |
| 7 | 33.1 | 23.9 | 10.1 | 8.0 | 6.3 | 375 | 2.5 | 685 |
| 16 | 27.8 | 23.8 | 11.4 | 9.6 | 7.4 | 380 | 3.0 | 915 |
| 20 | 29.5 | 30.4 | 14.5 | 11.2 | 8.7 | 475 | 3.5 | 520 |
| 26 | 25.4 | 35.0 | 16.7 | 12.8 | 9.7 | 535 | 4.5 | 440 |
| 32 | 17.9 | 44.5 | 20.2 | 15.5 | 10.8 | 675 | 7.5 | 350 |
| 46 | 16.5 | 48.8 | 22.8 | 17.0 | 11.5 | 790 | 8.5 | 285 |
| 56 | 9.4 | 52.1 | 22.8 | 16.0 | 9.4 | 865 | 13.5 | 180 |

TABLE 5

Influence of the addition of vapor

Lignite D
Activating temperature: 950° C.

| Water Content of the lignite % by wt. | Carbon g/h (TS) | Addition of vapor g/h | Furnace yield % weight | Benzene Isotherm AS (% by weight) | | | | Iodine value mg/g | Methylene blue titer ml/0.1 g | Molasses value mg |
|---|---|---|---|---|---|---|---|---|---|---|
| | | | | 9/10 | 1/10 | 1/100 | 1/1000 | | | |
| <1 | 300 | — | 38.3 | 14.2 | 6.8 | 5.5 | 4.1 | 275 | 2.0 | 2800 |
| <1 | 300 | 1000 | 8.8 | 35.4 | 15.1 | 10.7 | 6.4 | 570 | 8.0 | 335 |
| 56 | 300 | — | 9.4 | 52.1 | 22.8 | 16.0 | 9.4 | 865 | 13.5 | 180 |
| 56 | 900 | — | 26.9 | 29.5 | 17.8 | 14.3 | 10.2 | 610 | 4.0 | 965 |
| 56 | 900 | 1000 | 19.6 | 47.1 | 21.9 | 15.6 | 9.9 | 790 | 9.5 | 320 |

TABLE 6

Variation of the raw material under potassium catalysis

Activating temperature: 950° C.
Carbon charge: 600 g/h and onto dry carbon

| Lignite | Potassium content % weight | Water content % by wt. | Furnace yield % weight | Benzene Isotherm AS (% by weight) | | | | Iodine value mg/g | Methylene blue titer ml/0.1 g | Molasses value mg |
|---|---|---|---|---|---|---|---|---|---|---|
| | | | | 9/10 | 1/10 | 1/100 | 1/1000 | | | |
| A | — | 46.0 | 16.2 | 43.3 | 18.4 | 11.0 | 6.6 | 595 | 9.0 | 190 |
| A | 1.0 | 49.1 | 13.0 | 58.2 | 24.1 | 14.5 | 7.3 | 690 | 12.5 | 155 |
| B | — | 49.0 | 22.4 | 37.2 | 18.6 | 12.7 | 8.6 | 610 | 8.0 | 280 |
| B | 1.0 | 51.9 | 19.2 | 51.2 | 24.9 | 17.5 | 11.3 | 830 | 13.0 | 230 |
| C | — | 51.0 | 15.4 | 56.5 | 20.0 | 13.3 | 8.9 | 665 | 10.5 | 190 |
| C | 1.0 | 53.4 | 14.1 | 60.4 | 30.6 | 20.8 | 11.6 | 995 | 12.5 | 155 |
| E | — | 59.0 | 21.7 | 44.3 | 28.9 | 23.4 | 15.3 | 1035 | 13.0 | 415 |
| E | 1.0 | 57.0 | 22.5 | 47.3 | 39.2 | 31.5 | 19.2 | 1260 | 18.5 | >3000 |

TABLE 7

Variation of the potassium content

Lignite C
Activating temperature: 950° C.
Carbon charge: 600 g/h and onto dry carbon

| KOH content % by weight | Water content % by wt. | Furnace yield % weight | Benzene Isotherm AS (% by weight) | | | | Iodine value mg/g | Methylene blue titer ml/0.1 g | Molasses value mg |
|---|---|---|---|---|---|---|---|---|---|
| | | | 9/10 | 1/10 | 1/100 | 1/1000 | | | |
| — | 51.0 | 15.4 | 56.5 | 20.0 | 13.3 | 8.9 | 665 | 10.5 | 190 |
| 0.5 | 53.6 | 11.9 | 55.8 | 24.1 | 16.9 | 10.8 | 780 | 13.0 | 200 |
| 1.0 | 53.6 | 14.1 | 60.4 | 30.6 | 20.8 | 11.6 | 995 | 12.5 | 155 |
| 1.5 | 53.6 | 13.8 | 62.6 | 36.3 | 21.5 | 9.4 | 1200 | 18.0 | 150 |
| 2.0 | 53.6 | 14.1 | 60.9 | 38.1 | 22.3 | 10.4 | 1095 | 17.5 | 325 |

I claim:

1. A method of producing an activated carbon from pit-wet lignite by an activation reaction, consisting essentially of adding potassium ions to the pit-wet lignite and then adding water vapor and simultaneously heating the pit-wet lignite to a temperature of at least 600° C. for a time sufficient for activation and subsequently washing with water, to obtain an activated carbon which displays improved adsorption capacity, wherein up to 2% by weight potassium ions on a dry basis are added to the lignite and said water vapor being present in an amount sufficient to improve the adsorption capacity of said activated carbon.

2. The method of producing an activated carbon as defined in claim 1 wherein said temperature is at least 800° C.

3. The method of producing activated carbon as defined in claim 1, wherein said water vapor is added at a rate of 1000 g/h.

4. A method of producing activated carbon as defined in claim 1, wherein said potassium ions are added in the form of potassium hydroxide.

5. A method of producing activated carbon as defined in claim 4, wherein 1% by weight potassium hydroxide is added to the lignite.

6. A method of producing activated carbon as defined in claim 1, wherein said lignite is lignite C.

7. The method of producing activated carbon as defined in claim 1, wherein said heating lasts for approximately 15 minutes.

* * * * *